Patented Jan. 1, 1946

2,392,140

UNITED STATES PATENT OFFICE 2,392,140

PREPARATION OF CYCLOPENTADIENE RESIN

Howard L. Gerhart, Milwaukee, Wis., assignor to Pittsburgh Plate Glass Company, Allegheny County, Pa., a corporation of Pennsylvania No Drawing. Application December 3, 1943, Serial No. 512,766

7 Claims. (Cl. 260—23)

The present invention relates to the preparation of a modified or copolymer resin containing a diene hydrocarbon as a main reactive constituent, and it has particular relation to the preparation of a copolymer of cyclopentadiene and an unsaturated glyceride oil.

One object of the invention is to prepare a hard, tough, chemically resistant and water resistant resin, or an oily resinous body capable of hardening to such state from cyclopentadiene and an unsaturated oil.

A second object is to provide a simple and inexpensive process of preparing such product.

These and other objects will be apparent from consideration of the following specification and the appended claims.

In a copending patent application to Howard L. Gerhart, Serial No. 324,392, filed March 16, 1940, and entitled Resinous material it is disclosed that cyclopentadiene copolymerizes with unsaturated glyceride oils or free fatty acids therefrom, to provide resins which are solids or oils, dependent upon the ratio of oil and other factors. These resins are unsaturated and in many instances the oily forms have drying properties superior even to tung oil. The copolymers of cyclopentadiene and glyceride oils as disclosed in the foregoing application usually are prepared by conjointly polymerizing cyclopentadiene and glyceride oil at atmospheric pressures and in the presence of a halide salt of an amphoteric element as a catalyst.

The present invention is based upon the discovery that cyclopentadiene and unsaturated glyceride oils can conveniently be polymerized by heating them to a sufficiently high temperature in a pressure chamber, such as an autoclave or a long tube through which the reactants are circulated continuously or intermittently. In this reaction no catalyst is required, thus reducing costs, eliminating corrosive and often poisonous effects and, also, forming a product which is more resistant to water and chemicals than that produced by catalysis.

Glyceride oils that can be employed in the process include linseed oil, soya bean oil, oiticica oil, perilla oil, tung oil, corn oil, cottonseed oil, palm, sardine oil, or the like. The cyclopentadiene and the glyceride oils are mutually highly soluble.

The ratio of oil to cyclopentadiene may vary over a relatively wide range, dependent upon the nature of the product to be obtained. For example, the oil may be as low as 10% of the mixture or as high as 96%.

A good varnish can be obtained with a range of oil of from 30 to 70%. When the oil is below 40%, the resin tends to be a solid which is soluble in drying oils and is a useful "gum" in the paint industry. When the oil is above 70%, a "long" oil varnish results. Very long oil varnishes may be considered to be new synthetic oils since they have the property of oils rather than of varnishes. The drying rate of the long oil modifications is much faster than the unmodified oil. "Gums" such as the above-described, or rosin, or alkyd resin, or the like can be cooked into it to provide good varnish. The procedure is that conventionally employed in the paint industry in the cooking of varnishes.

In the present invention, cyclopentadiene is heated in the presence of an unsaturated glyceride oil to about 200 to 290° C. in an autoclave but below the point of charring of the reactants or the product and at a resulting pressure of about 25 to 200 pounds per sq. inch gauge. Under these conditions two reactions are believed to take place: (1) The cyclopentadiene reacts with the double bonds of the oil and this reaction product reacts further by dimerization to give a bodying action to the oil; (2) The cyclopentadiene reacts with itself to form a dimer. It reacts with the dimer to form a trimer; it reacts with the trimer to form a tetramer and so forth. Simultaneously at a temperature above 200° C. the dimer, trimer, tetramer, etc. decompose in part to monomer, which reacts with glyceride oil. In other words in the temperature range of 200° to 300° C. there appears to be an equilibrium between the monomer and the dimer, trimer, tetramer, etc. according to this scheme:

Monomer⇌dimer[+monomer]⇌trimer[+monomer]⇌tetramer[+monomer]⇌pentamer, etc.

While this invention is not to be limited to any strict explanation of the reactions involved it is recognized that two separate reactions may take place. Since the pentamer and higher multiples of cyclopentadiene are not soluble in glyceride oils it is desirable that in any thermal treatment of cyclopentadiene, the amount of pentamer be kept at a minimum. It has been found that this is the case when cyclopentadiene is heated in the presence of glyceride oil. It was found that under the conditions of this invention, substantially all of the cyclopentadiene is reacted with the oil and a very small amount is converted to dimer, trimer, tetramer, pentamer, etc.

Example I

A mixture of 492 parts alkali refined unbodied linseed oil and 308 parts of cyclopentadiene is charged into an autoclave suitably equipped. The charge is heated according to the following schedule with the resultant pressures.

| Time, minutes | Temp., °C. | Pressure gauge | Gardner-Holdt viscosity 50% in petroleum naphtha |
|---|---|---|---|
| 0 | 25 | 0 | |
| 30 | 130 | 65 | |
| 65 | 200 | 95 | |
| 85 | 220 | 75 | |
| 120 | 265 | 58 | |
| 180 | 265 | 30 | Less than A. |
| 220 | 265 | 34 | |
| 230 | 265 | 30 | B. |
| 265 | 265 | 30 | |
| 270 | 265 | 25 | |
| 275 | 265 | 25 | H to I. |

At the end of the bodying period the entire charge is cooled and drained into the desired quantity of solvent. A convenient amount is an equal weight of petroleum naphtha of the desired boiling range and flash point.

The copolymer thus formed has excellent characteristics as a film-forming material for both air drying and baking uses. The drying rate is rapid even when the oil in the charge is a slow drying oil such as soya oil. A copolymer of soya oil and cyclopentadiene made according to this process does not dry with an after tack as do varnishes made from soya oil and the present varnish gums.

The following compositions are illustrative of the charges which can be used:

Example II

| | Parts |
|---|---|
| Unbodied alkali refined linseed oil | 600 |
| Cyclopentadiene | 400 |

Example III

| | Parts |
|---|---|
| Unbodied alkali refined soya oil | 540 |
| Cyclopentadiene | 450 |

Example IV

| | Parts |
|---|---|
| Alkali refined medium bodied linseed oil | 500 |
| Cyclopentadiene | 500 |

Example V

| | Parts |
|---|---|
| Alkali refined unbodied soya oil | 900 |
| Cyclopentadiene | 100 |

The copolymer from this composition is a synthetic oil which dries as rapidly as alkali refined linseed oil.

Example VI

| | Parts |
|---|---|
| Tung oil | 1,000 |
| Linseed oil | 300 |
| Cyclopentadiene | 1,000 |

Example VII

| | Parts |
|---|---|
| Tung oil | 1,000 |
| Cyclopentadiene | 1,000 |

It will be appreciated that glycerides of completely saturated acids, such as stearic acid or lauric acid do not react with cyclopentadiene. Where an oil such as cottonseed oil or palm oil is polymerized with cyclopentadiene, it may be desirable to remove some of the unreacted saturated glycerides from the product. This may be accomplished by chilling and freezing out the higher melting components or by extracting the unreacted component with a solvent such as ether or a "cellosolve" such as monobutyl ether of ethylene glycol or other oxygenated solvent.

The embodiments of the invention herein disclosed are merely by way of example. Numerous modifications may be made therein without departure from the spirit of the invention or the scope of the claims.

What I claim is:

1. A process of preparing a copolymer of cyclopentadiene and an unsaturated glyceride oil which comprises heating in a closed system under pressure a mixture of cyclopentadiene and unsaturated glyceride oil, the oil constituting about 10 to 96% of said mixture, at a temperature above about 200° C. and below that of charring of the mixture or the reaction product.

2. A process of preparing a copolymer of cyclopentadiene and an unsaturated glyceride oil which process comprises heating a mixture comprising cyclopentadiene and said oil, the oil being in a ratio of 10 to 96% of the mixture, in a closed system at a pressure above about 25 lbs. per square inch and at a temperature above 200° C. and below that of charring of the mixture.

3. A process of preparing a copolymer of cyclopentadiene and an unsaturated glyceride oil which process comprises heating a mixture comprising cyclopentadiene and an unsaturated glyceride oil, the oil being in a ratio within the range of 10 to 96% of the mixture in a closed container under pressure within the range of about 25 to 200 lbs. per square inch and at a temperature of about 200 to 290° C.

4. A process as defined in claim 1 in which the ratio of oil in the mixture is 30 to 70%.

5. A process as defined in claim 3 in which the mixture is heated for a period of approximately 180 to 275 minutes.

6. A process as defined in claim 3 in which heating is continued until a substantial pressure drop is observed.

7. A process as defined in claim 3 in which the oil is linseed oil and the heating operation is continued until a substantial pressure drop is observed.

HOWARD L. GERHART.